United States Patent [19]
Baker

[11] Patent Number: 5,324,091
[45] Date of Patent: Jun. 28, 1994

[54] CARGO BED ENCLOSURE

[76] Inventor: Ben B. Baker, 1231 W. Linda Vista Blvd., Oro Valley, Ariz. 85737

[21] Appl. No.: 58,894

[22] Filed: May 6, 1993

[51] Int. Cl.⁵ .................................................. B60J 7/06
[52] U.S. Cl. ..................................... 296/100; 296/104
[58] Field of Search .................. 296/100, 98, 104, 156

[56] References Cited

U.S. PATENT DOCUMENTS

| | | | |
|---|---|---|---|
| 4,310,194 | 1/1982 | Biller | 296/159 |
| 4,915,440 | 4/1990 | Daniel et al. | 296/104 |
| 4,955,660 | 9/1990 | Leonard | 296/165 |
| 4,964,669 | 10/1990 | Geier | 296/108 |
| 5,016,935 | 5/1991 | Semple | 296/26 |
| 5,050,924 | 9/1991 | Hansen | 296/100 |
| 5,054,841 | 10/1991 | Zalman | 296/165 |
| 5,056,855 | 10/1991 | Moravsky | 296/98 |
| 5,058,652 | 10/1991 | Wheatley et al. | 296/100 X |
| 5,186,513 | 2/1993 | Strother | 296/100 |
| 5,238,288 | 8/1993 | Chandler | 296/100 |

*Primary Examiner*—Robert R. Song
*Attorney, Agent, or Firm*—Ogram & Teplitz

[57] ABSTRACT

A cargo bed cover in which two frames are used to provide a rigid fabric shell. The first frame is rigid and is constructed of metal piping or other suitable material. The second frame is constructed of flexible stock preferably having a substantially flat cross section and sewn into or secured to the fabric material. Acting as battens, the flexible stock tends to keep the fabric taut during wind pressure either through ambient conditions or through the vehicle's movement. The flexible frame is secured to the rigid frame through ties.

67 Claims, 4 Drawing Sheets

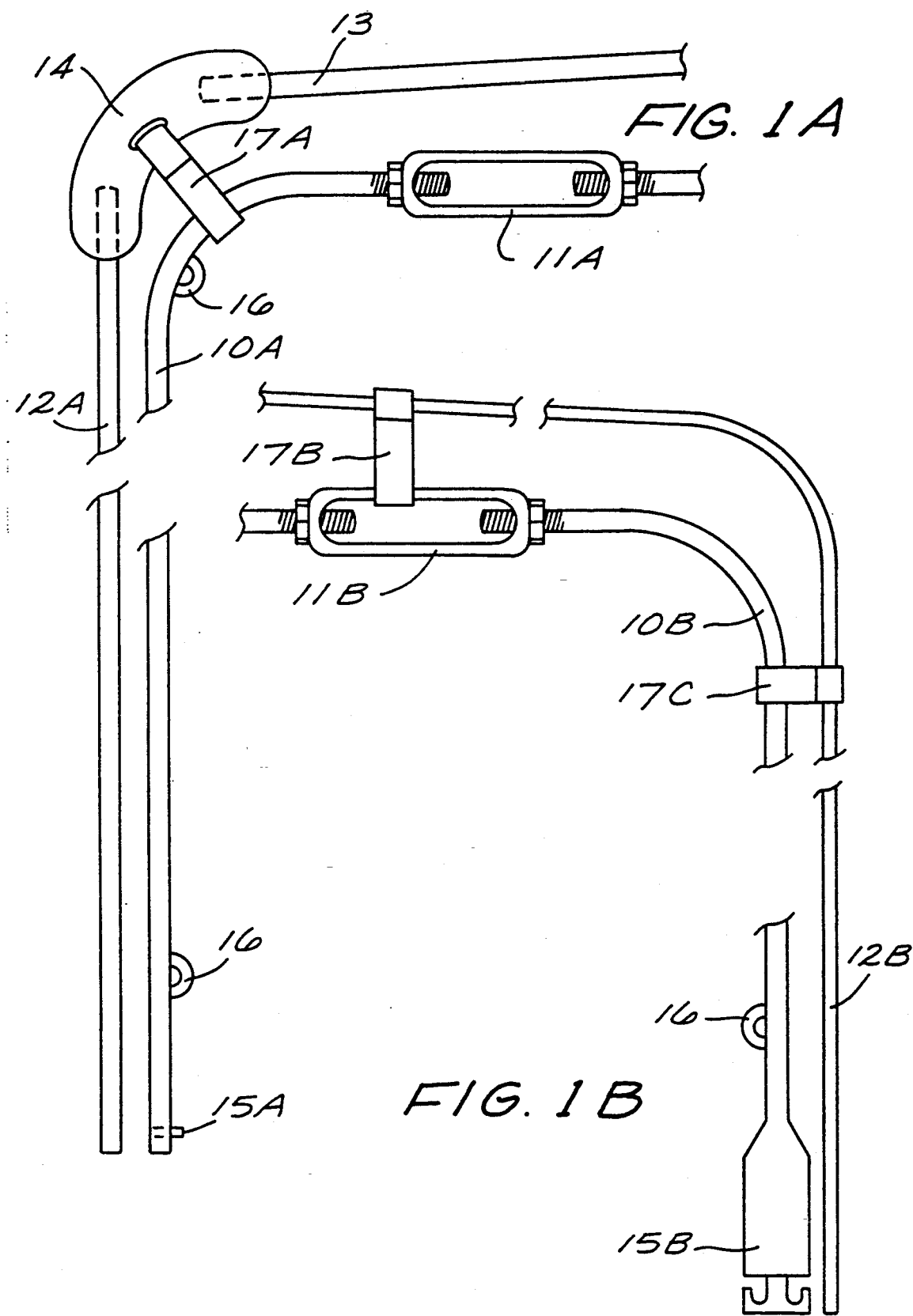

CARGO BED ENCLOSURE

BACKGROUND OF THE INVENTION

This invention relates generally to vehicles and more particularly to covers for cargo beds.

Cargo beds on vehicles have always suffered from a dual objective: on the one hand, the user wants an open cargo bed since this allows easy loading and unloading; yet, on the other hand, there are times when the cargo requires protection from the elements and security from theft.

In an attempt to provide this protection, an assortment of caps, shells, or rigid covers have been developed which fully enclose the cargo bed. These shells provide for optimal protection from the elements and from theft; but, they are also heavy and extremely cumbersome to remove and store should the user desire an open cargo bed. Because of this, typically once the shell is attached to the vehicle, it is seldom removed.

To solve this problem, a variety of mechanisms have been developed which attempt to make the shell easier to remove and store. Some such mechanisms are described in: U.S. Pat. No. 5,056,855, entitled "Vehicle Bed Cover Assembly" issued to Moravsky on Oct. 15, 1991; U.S. Pat. No. 5,016,935, entitled "Collapsible Cap for a Pickup Truck Box" issued to Semple on May 21, 1991; U.S. Pat. No. 4,784,429, entitled "Collapsible Camper Top for Pick-up Trucks" issued to Hodges on Nov. 15, 1988; and, U.S. Pat. No. 5,054,841, entitled "Portable Pickup Truck Camper Shell Standard or Roll Bar Model" issued to Zalman on Oct. 8, 1991.

In all of these situations though, the resulting mechanism was so complex that its purpose was averted—to make the shell easier to attach or remove from the pickup.

Going to an extreme was the creation of the tonneau cover which covers only the lower portion of the cargo bed. One such apparatus is described in U.S. Pat. No. 4,792,178, entitled "Truck Tonneau Cover Assembly" issued to Kokx on Dec. 20, 1988.

Although easy to use, the tonneau cover is extremely restrictive on the cargo which can be enclosed and as such it has not won wide acceptance.

In an effort to reduce the weight and expand upon the cargo space available, a variety of tarpaulin or fabric covered shells have been developed, including: U.S. Pat. No. 3,785,694, entitled "Flexible Cover Assembly" issued to Sargent on Jan. 15, 1974; U.S. Pat. No. 4,380,350, entitled "Truck Box Tarpaulin Assembly" issued to Block on Apr. 19, 1983; U.S. Pat. No. 4,310,194, entitled "Tent Camper for Pickup Truck" issued to Biller on Jan. 12, 1982; U.S. Pat. No. 4,756,325, entitled "Collapsible Canopy for Pick-up Trucks" issued to Daniels on Jul. 12, 1988; U.S. Pat. No. 4,955,660, entitled "Test Structure for Pickup Truck" issued to Leonard on Sep. 11, 1990.

Although these tarpaulin and fabric shells are lighter and generally easier to install and remove, the all suffer from deformation and drag due to the forces of wind. As the vehicle travels, or even during a windy day, the fabrics tend to whip and bow causing additional drag to the vehicle and wear on the fabric.

It is clear from the foregoing that there exists a need for an improved cargo bed cover which is easy to install, easy to remove, light weight, and yet resists wind deformation.

SUMMARY OF THE INVENTION

Within this invention, a cargo bed cover is created in which two frames are used with a fabric shell. The first frame is rigid and is constructed of metal piping or other suitable material. The second frame is constructed of flexible stock preferably having a substantially flat cross section and sewn into or secured next to the fabric material. The flexible stock tends to keep the fabric taut during wind pressure either through ambient conditions or through the vehicle's movement. The flexible frame is secured to the rigid frame through ties.

The invention utilizes a dual frame concept. The first frame is constructed of rigid material, such as a steel rod or an aluminum piping in the preferred invention. The second frame is formed of flexible material which is sewn or attached to the fabric. A plastic or compound material is ideal for this second flexible frame. Those of ordinary skill in the art readily recognize a variety of materials which will suit this task.

In one embodiment of the invention, the second frame is "free floating" within a sleeve within the fabric.

This flexible frame overlays or is above the rigid frame and tends to push the fabric up and away from the rigid frame. This outward pressure from the flexible frame is used to maintain the shape of the cover during winds caused either from ambient air flow or from air flow due to the vehicle's motion.

In one embodiment, the flexible frame is further held to the rigid frame by ties so that a desired aerodynamic shape is created.

The pressure from the flexible frame is further enhanced in one embodiment of the invention through the use of a spring loading of the frame. This spring tends to push the flexible frame up and away vertically from the cargo bed of the truck and provides an even more taught fabric to resist wind deformation.

In one embodiment of the invention, the rigid frame is collapsible such that it may be easily disassembled and stored. In this embodiment, the entire unit is stored behind the seat of the pick-up truck or other such small place the operator may find. This disassembly also permits an adjustment to be made in the frame's width so that manufacture of a single frame permits it to adapt to a variety of cargo bed dimensions.

In the preferred embodiment, both frames are selectively attachable at their base to a connecting member which extends around the periphery of the cargo bed. This connecting member or base plate is also used to form the seal of the fabric shell to the bed.

Another connecting member used are individual units which attach to select locations around the cargo bed. Each of these units provides a locus for attachment of the frames and also for sealing of the covering to the cargo bed.

Still another embodiment features a base member which is semi-permanently attached to the periphery of the cargo bed. This base member accepts the insertion or attachment of the dual frames directly and provides for attachment either by the cable method, snaps, or other such mechanisms well known to those of ordinary skill in the art.

This seal is preferably formed by pressing the fabric against the connecting member or truck bed through the use of taught cables. A pliable member such as a sponge rubber seal is provided at the bottom of the fabric so that as the fabric is pressed against the connecting member, a weather seal is created.

Other semi-rigid battens are also enclosed in the fabric in other embodiments of the invention. These battens are either parallel or perpendicular to the flexible frame to provide further "stiffening" of the fabric so as to provide a cargo bed cover which resists wind deformation even further.

Because of the attributes of the preferred embodiment, the cover is placeable over tool-boxes built into the cargo bed. Access to these boxes, and also to other areas within the cargo bed, is easily accomplished through a zippered opening in the fabric covering.

The invention, together with various embodiments thereof, will be more fully described the following drawings and their descriptions.

DRAWINGS IN BRIEF

FIGS. 1A and 1B are side views of two embodiments of the invention illustrating the dual frame concept of the present invention.

DRAWINGS IN DETAIL

FIGS. 1A and 1B are side views of two embodiments of the invention illustrating the dual frame concept of the present invention.

FIG. 1A shows the left and top portion of rigid frame member 10A. In this embodiment, the left portion of rigid frame member 10A attaches via coupling 11A to a center portion consisting of a straight rod which then attaches to the right portion (not shown). Through manipulation of coupling 11A, the width of the arch formed by the rigid frame member 10A is adjustable to match the demands of a variety of cargo beds.

In this embodiment, flexible frame member is composed of several section 12A, 13, and another section for the right side (not shown). These sections are connected by a securing member 14 which connects flexible frame member 12A to flexible frame member 13. Securing member 14 is also used to connect, via tie 17A, the flexible frame to the rigid frame 10A.

Loops 16 permit the operator to attach bags and secure other devices to the rigid frame member. This attribute of the invention provides for enhanced storage capability since many items may be "slung" from these loops 16. The hooks are provided a downward pressure by their cargo which further secures the frame to the attaching members.

Through the judicious use of these loops 16, bags, and containers, the entire floor of the cargo bed may be relieved for carrying other goods.

Also, raising the goods into nets or the like onto the loops 16 reduces the possibility of water damage should either the frame leak or a container spill into the bottom of the cargo bed.

Connector 15A is used to secure the rigid frame member to the cargo bed. Those of ordinary skill in the art readily recognize a variety of mechanisms which can be used in this context.

FIG. 1B illustrates another embodiment of the invention. As in FIG. 1A, this embodiment utilizes the dual frame concept with rigid frame member 10B being attachable to its counterpart (not shown) via a straight rod coupling 11B.

In this embodiment though, flexible frame member 12B is a single piece extending across the entirety of the cargo bed and has a generally flat cross section permitting it to bend as indicated. An alternative is to make the flexible frame member articulated which permits easy storage when not in use.

Ties 17B and 17C are used to affix the upper arch of flexible frame 12B to the rigid frame 10B.

Connector 15b is used to affix the rigid frame to the bed of the vehicle. Loops 16 are also available in this embodiment to assist in securing additional cargo to the rigid frame in net pouches or the like.

Figure 2A:
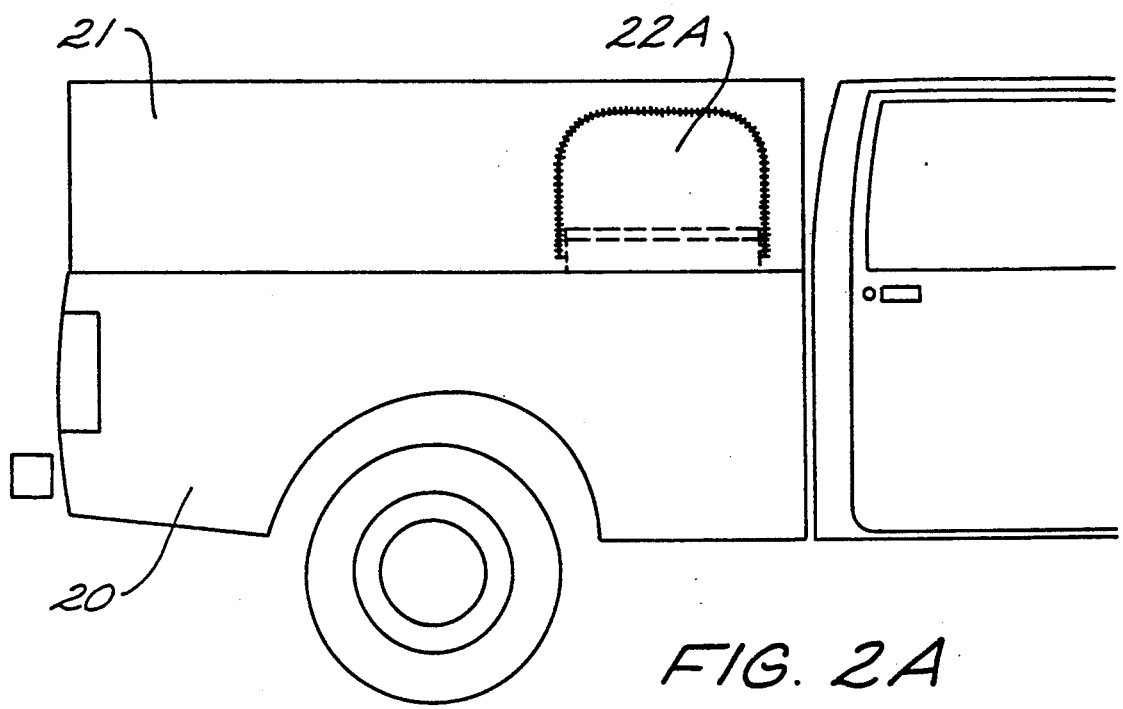
FIGS. 2A and 2B are side views of the preferred embodiment of the invention in which an opening is provided for external access to the interior of the cargo bed.
Figure 2B:
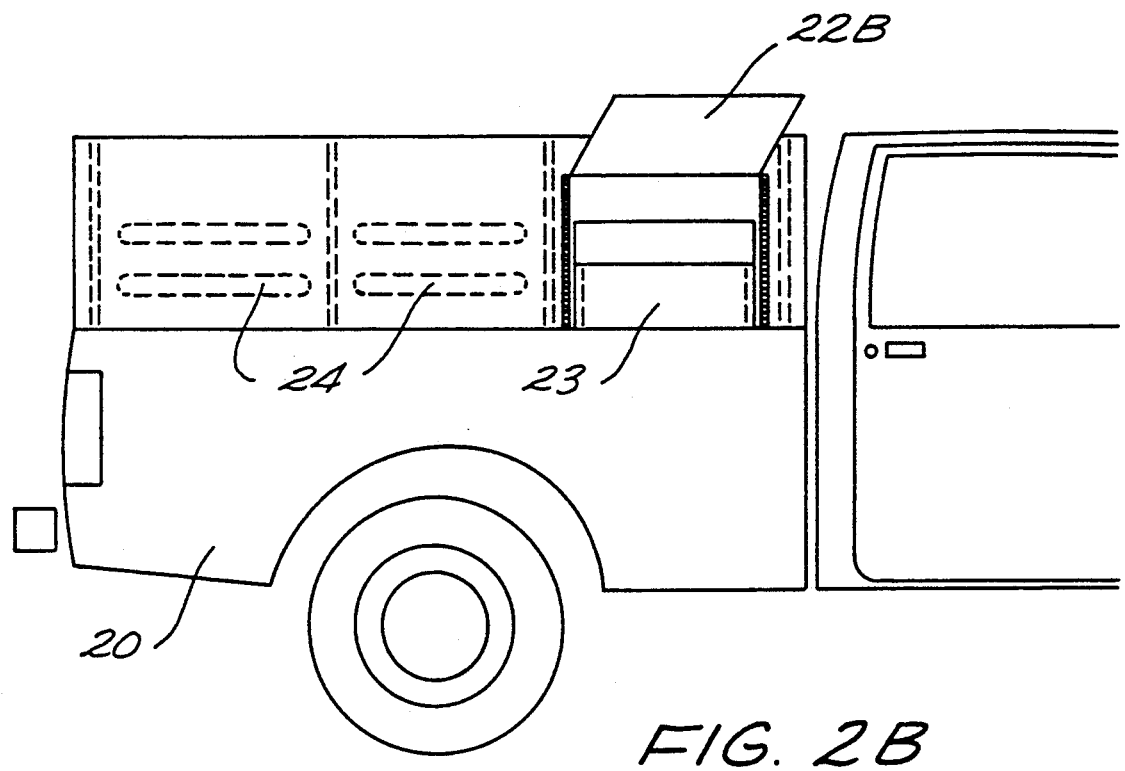

FIGS. 2A and 2B are side views of the preferred embodiment of the invention in which an opening is provided for external access to the interior of the cargo bed.

As shown in FIG. 2A, pick-up 20 has cover 21 attached thereto. A zippered door 22A is closed in this illustration and is positioned to grant access to the tool box 23 contained within the cargo bay area. Those of ordinary skill in the art readily recognize that a hook-and-loop arrangement to affix door 22A is also usable in place of the zipper.

By opening the door and raising it, 22B, full access is easily granted to tool box 23. In this manner, the preferred embodiment permits tool box access even though the cover is installed with the tool box remaining attached to the pick-up.

Also shown in this illustration is the use of semi-rigid battens 24 which are sewn into the fabric of the cover. These battens further assist in resisting wind deformation of the cover.

Figure 3:
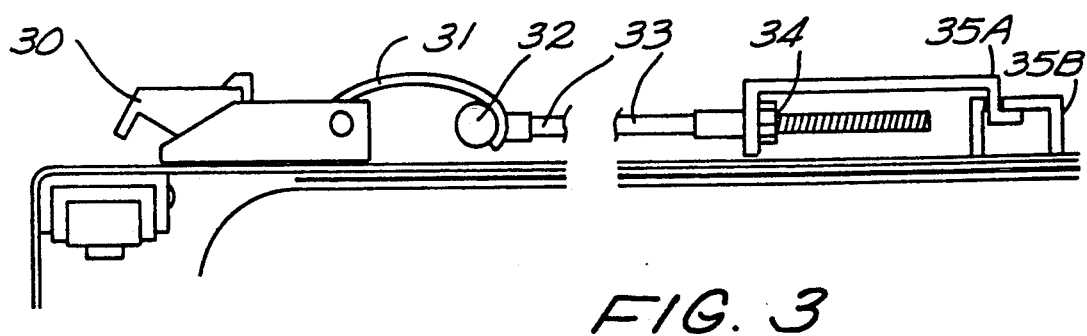
FIG. 3 is a side view showing the clipping mechanism used to secure a cable above the tailgate.

FIG. 3 is a side view showing a type of clipping mechanism used to secure a cable used in the preferred embodiment of the invention.

Within the preferred embodiment, a cable is used to secure the periphery of the fabric to the bed of the vehicle. At the back of a pick-up or similar vehicle is usually a "tail-gate" arrangement. The clamping mechanism of FIG. 3 is used to secure the fabric over the tail-gate portion.

Cable 33 extends from a clasp 30 to bracket 35B. Clasp 30 has latch 31 which is securable to ball joint 32 forming the end of cable 33. As latch 31 is secured, tension is placed on cable 33.

At the other end of cable 33, is bracket 35B which is secured to cable 33 via key 35A which mates with bracket 35B to form a secure bond. When tension in the cable 33 is released, key 35A is easily removed from bracket 35b permitting the entire cable portion 33 to be moved to a convenient; cable portion 33 is secured to the fabric (not shown) in a manner illustrated in FIG. 6 location during loading and unloading through the tail-gate section.

In this way, with the cable sewn into, or threaded through, the bottom of the rear flap, the cable is released and the flap with cable is tossed by the user onto the top of the cover; thereby giving free and unrestricted access to the cargo bed for loading and unloading purposes.

Screw adjustment 34 is used to adjust the overall length of cable 33 so that the cable fits the dimension of the tail-gate in question and allows adjustment for cable stretch or contraction due to pressures and temperature changes.

Figure 4B:
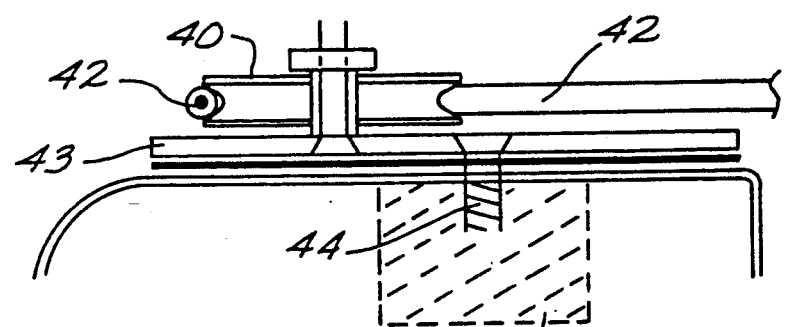
FIGS. 4A and 4B are top and side views respectively of the pulley assembly used in wrapping the cable of the preferred embodiment.
Figure 4A:
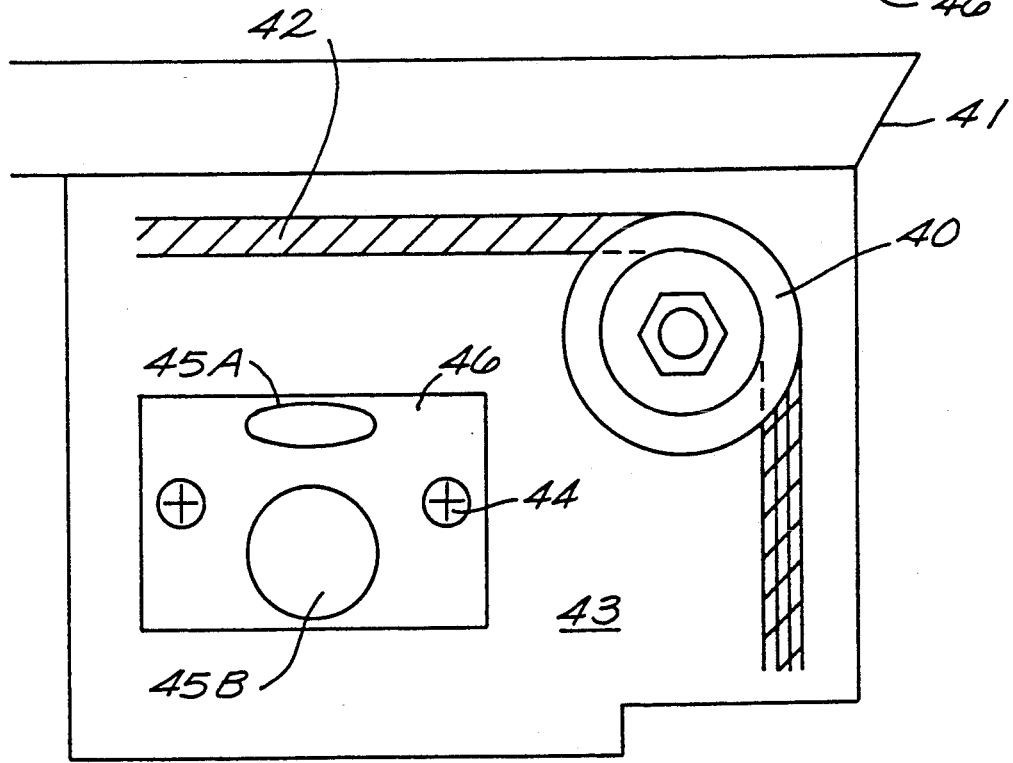

FIGS. 4A and 4B are top and side views respectively of the pulley assembly used in wrapping the cable of the preferred embodiment.

The preferred embodiment has a cable extending around at least three sides of the cargo bed. Cable 42 extends along one edge of side 41 of the cargo bed and is redirected by pulley 40. The pulley 40 permits the cable to be tightened easily and readily through a variety of mechanisms well known to those of ordinary skill in the art.

Pulley 40 is secured to the side of the vehicle via connector plate 43 which is secured to the edge of the cargo bed at the rail via bolt 44.

Also involved in connector plate 43 is frame connection 46 which secures both the rigid frame and the flexible frame (neither shown). Slot 45A is designed to hold the preferred embodiment's relatively flat flexible frame; and connector 45b is used to secure the preferred embodiment's aluminum piping.

By keeping the securing point of the two frames (rigid and flexible) in close proximity, the two frames, via the ties already discussed, provide a greatly enhanced structure which resists wind deformation.

Figure 5:
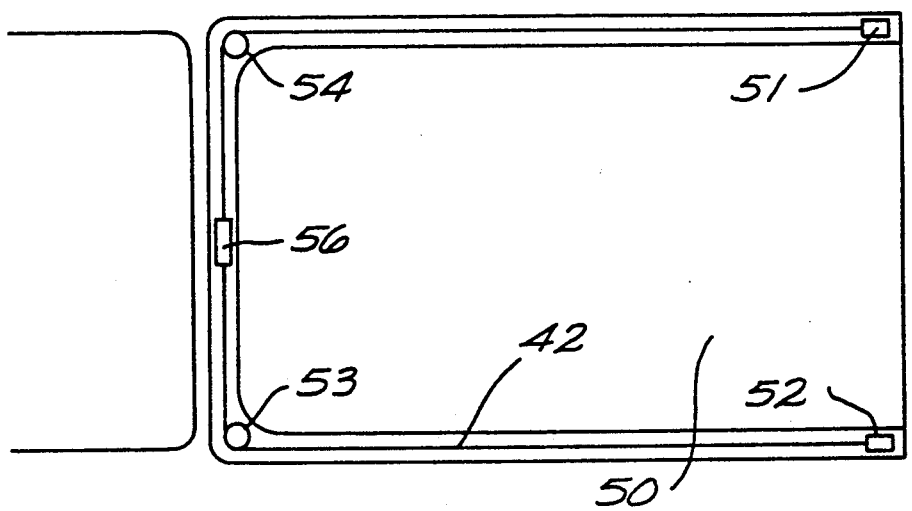
FIG. 5 is a top view of a cargo bed showing the use of the preferred embodiment's cable.

FIG. 5 is a top view of a cargo bed showing the use of the preferred embodiment's cable.

As noted earlier, the intent of the cable is to encircle the cargo bed with cables. As shown, cable 42 extends from connector 52, around pulley 53, around pulley 54, and finally to connector 51. In this manner, cargo bay 50 has an efficient mechanism to secure the fabric and make a water tight seal with the bed of cargo bay 50.

Turn-buckle 56 permits compensation to be made for differing cable lengths due to manufacturing variations, temperature changes, pressures, variations in attachment members 51 and 52, and the like.

Figure 6:
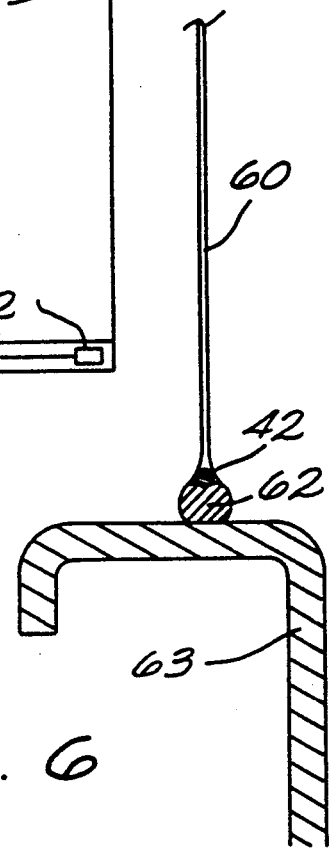
FIG. 6 is a side cut-away view of the preferred fabric assembly highlighting the sealing characteristic of an embodiment of the invention.

FIG. 6 is a side cut-away view of the preferred fabric assembly highlighting the sealing characteristic of the invention.

This seal against the side panel 63 of the cargo bay is created by rubber gasket 62 being pressed against the top of the side panel 63 by cable 42. Through proper adjustment of the tension of cable 42 and the physical amount of sealing gasket 62 put in at manufacture, almost any level of sealing and protection is obtainable.

In the preferred embodiment, gasket 62 and cable 42 are fully enclosed within a pocket of fabric 60; but, those of ordinary skill in the art readily recognize various other arrangements which obtain this same objective including the use of hooks from the fabric to the cable and the use of an external sealing gasket.

Figure 7:
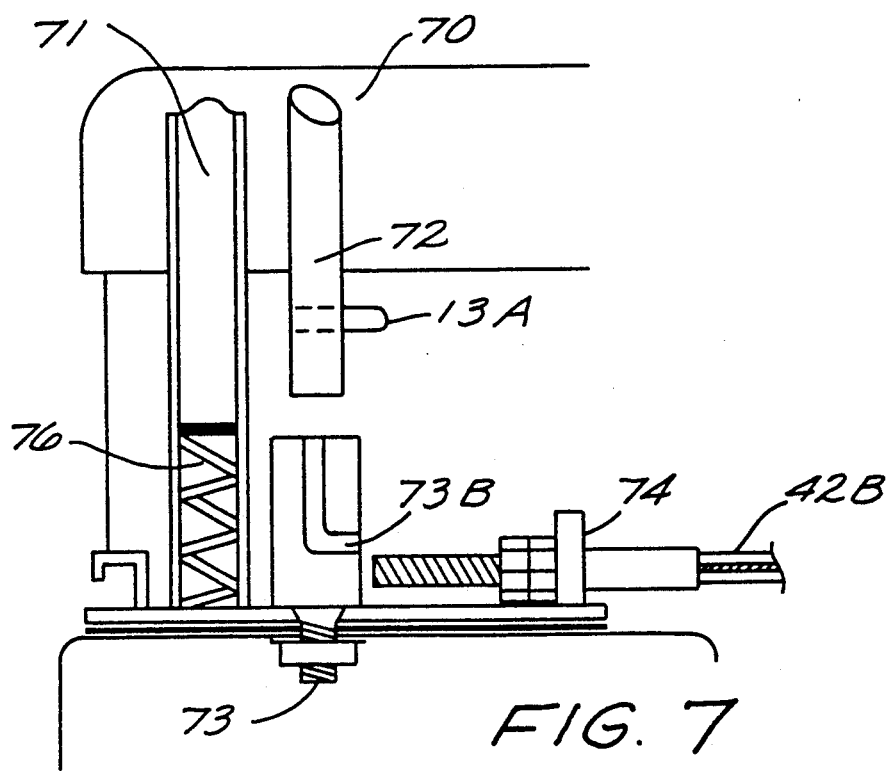
FIG. 7 is a side cut-away view of the preferred embodiment illustrating the attachment of the dual frames.

FIG. 7 is a side cut-away view of the preferred embodiment illustrating the attachment of the dual frames and illustrates another use of the cables from the pulley system of FIG. 5.

As shown, this embodiment of the invention utilizes a connecting mechanism for the rigid frame 72, connected by pin 15A mating with slot 73B, and flexible frame 71. In this embodiment of the invention, flexible frame 71 is spring loaded 76 to provide an upward tension in the flexible frame member and thereby further increase the cover's resistance to wind deformation.

Note that this connector assembly is positioned forward of tool box 70, between the cab and the bed of the vehicle. Cable attachment 74 is used across the front of the cargo bed in this embodiment. The connector is secured to the cargo bay via nut and bolt 75 or a clamp to facilitate removal; cable 42B extends across the front of the bed to secure and seal the fabric as first illustrated in FIG. 6.

Other connector mechanisms are well known to those of ordinary skill in the art including: U.S. Pat. No. 5,121,960, entitled Rail Attachment System for Tonneau Cover" issued to Wheatley on Jun. 16, 1992; U.S. Pat. No. 5,058,652, entitled "Tonneau Cover" issued to Wheatley et al. on Oct. 22, 1991; and, U.S. Pat. No. 4,627,655, entitled "Pick-Up Cap Construction" issued to Collins on Dec. 9, 1986; all of which are incorporated hereinto by reference.

What is claimed:

1. A cover for an exposed bed of a vehicle comprising:
   a) at least two rigid frame members being of an inverted U-shape and being attached to the bed of said vehicle;
   b) a fabric covering being disposed over said at least two rigid frame members;
   c) connecting means for securing said fabric covering to said bed;
   d) at least two flexible frame members being of an inverted u-shape and being disposed within said fabric covering, each of said flexible frame members positioned outward and proximate to one of said rigid frame members, each of said flexible frame members being secured to the bed; and,
   e) tie members securing each flexible frame member to one of said rigid frame members.

2. The cover according to claim 1 wherein said at least two rigid frame members includes means for selective detachment of the rigid frame member from said bed.

3. The cover according to claim 2 wherein each of said rigid frame members extends from a first side of said bed to a second side of said bed.

4. The cover according to claim 3 wherein each of said rigid frame members includes adjustment means for selectively adjusting a length of said frame member extending over said bed.

5. The cover according to claim 4 wherein said adjustment means includes means for separating said rigid frame member into a first unit and a second unit.

6. The cover according to claim 1 wherein each of said flexible frame members is enclosed within an channel formed by said fabric.

7. The cover according to claim 6 wherein each of said flexible frame members has a substantially flat cross-section and is positioned to extend across the entire width of said bed.

8. The cover according to claim 7 wherein each of said flexible frame members is secured to the bed at a point proximate to a point of securing said rigid frame member to the bed.

9. The cover according to claim 6 wherein said flexible frame member has a first portion, a second portion and a third portion and wherein the first portion is secured to said second portion by a first rigid securement member and the second portion is secured to the third portion by a second rigid securement member.

10. The cover according to claim 9 wherein the first and the second securement member is connectable to a selected rigid frame member via said tie members.

11. The cover according to claim 1 further including a plurality of intermediate members being composed of semi-rigid material, said intermediate members interposed in said fabric between said flexible frame members.

12. The cover according to claim 11 wherein said intermediate members are positioned parallel to said flexible frame members.

13. The cover according to claim 11 wherein said intermediate members are positioned perpendicular to said flexible frame members.

14. The cover according to claim 1 wherein said fabric covering includes sealing means for sealing a selected peripheral portion of said fabric covering to said connecting means.

15. The cover according to claim 14 wherein said sealing means includes an elastic material pressing against said connecting means.

16. The cover according to claim 15 wherein said elastic material is fully enclosed in an envelope of said fabric covering.

17. The cover according to claim 14 wherein said fabric covering includes a zippered flap portion for granting user access to the bed from a point exterior of said cover.

18. The cover according to claim 17 wherein said zippered flap portion is positioned proximate to a cab of said vehicle.

19. The cover according to claim 15 wherein said elastic material is pressed against said connecting means by a taut cable connected to said fabric.

20. The cover according to claim 19 wherein said taut cable extends along at least three sides of said cargo bed.

21. The cover according to claim 1 further including spring means for applying an upward pressure on said flexible frame members.

22. The cover according to claim 21 wherein said spring means attaches to said connecting means.

23. A vehicle assembly comprising:
   a) a vehicle having a cab portion and an exposed cargo bed; and,
   b) a cargo cover having,
      1) at least two rigid frame members being of an inverted u-shape and being attached to the cargo bed of said vehicle,
      2) a fabric covering being disposed over said at least two rigid frame members,
      3) connecting means for securing said fabric covering to said bed, and,
      4) at lest two flexible frame members being of an inverted u-shape and being disposed within said fabric covering, each of said flexible frame members positioned outward and proximate to one of said rigid frame members, each of said flexible frame members being secured to the cargo bed and to one of said rigid frame members.

24. The vehicle assembly according to claim 23 wherein said at least two rigid frame members includes means for selective detachment of the rigid frame member from said bed.

25. The vehicle assembly according to claim 24 wherein each of said rigid frame members extends from a first side of said cargo bed to a second side of said cargo bed.

26. The vehicle assembly according to claim 25 wherein each of said rigid frame members includes adjustment means for selectively adjusting a length of said frame member extending over said cargo bed.

27. The vehicle assembly according to claim 26 wherein said adjustment means includes means for separating said rigid frame member into a first unit and a second unit.

28. The vehicle assembly according to claim 23 wherein each of said flexible frame members is enclosed within an channel formed by said fabric.

29. The vehicle assembly according to claim 28 wherein each of said flexible frame members has a substantially flat cross-section and is positioned to extend across the entire width of said cargo bed.

30. The vehicle assembly according to claim 29 wherein each of said flexible frame members is secured to the cargo bed at a point proximate to a point of securing said rigid frame member.

31. The vehicle assembly according to claim 28 wherein said flexible frame member has a first portion, a second portion, and a third portion and wherein the first portion is secured to said second portion by a first rigid securement member and the second portion is secured to the third portion by a second rigid securement member.

32. The vehicle assembly according to claim 31 wherein the first and the second securement member is connectable to a selected rigid frame member.

33. The vehicle assembly according to claim 23 further including a plurality of intermediate members composed of semi-rigid material, said intermediate members being interposed in said fabric between said flexible frame members.

34. The vehicle assembly according to claim 33 wherein said intermediate members are position parallel to said flexible frame members.

35. The vehicle assembly according to claim 33 wherein said intermediate members are positioned perpendicular to said flexible frame members.

36. The vehicle assembly according to claim 23 wherein said fabric covering includes sealing means for sealing a selected peripheral portion of said fabric covering to said connecting means.

37. The vehicle assembly according to claim 36 wherein said sealing means includes an elastic material pressing against said connecting means.

38. The vehicle assembly according to claim 37 wherein said elastic material is fully enclosed in an envelope of said fabric covering.

39. The vehicle assembly according to claim 36 wherein said fabric covering includes a zippered flap portion for granting user access to the cargo bed from a point exterior of said cargo cover.

40. The vehicle assembly according to claim 39 wherein said zippered flap portion is positioned proximate to the cab of said vehicle.

41. The vehicle assembly according to claim 37 wherein said elastic material is pressed against said connecting means by a taut cable connected to said fabric.

42. The vehicle assembly according to claim 41 wherein said taut cable extends along at least three sides of said cargo bed.

43. The vehicle assembly according to claim 23 further including spring means for applying an upward pressure on said flexible frame members.

44. The vehicle assembly according to claim 43 wherein said spring means attaches to said connecting means.

45. A cargo bed cover for an exposed bed of a vehicle comprising:
a) at least two rigid frame members being of an inverted u-shape and being attached to the bed of said vehicle; and,
b) a fabric covering being disposed over said at least two rigid frame members and having therein at least two flexible frame members being of an inverted u-shape, said fabric being positioned such that each of said flexible frame members is outward and proximate to one of said rigid frame members and secured to the cargo bed.

46. The cargo bed cover according to claim 45 further including connecting means for securing said fabric covering to said cargo bed.

47. The cargo bed cover according to claim 46 wherein said at least two rigid frame members includes means for selective detachment of the rigid frame member from said cargo bed.

48. The cargo bed cover according to claim 47 wherein each of said rigid frame members extends from a first side of said bed to a second side of said cargo bed.

49. The cargo bed cover according to claim 48 wherein each of said rigid frame members includes adjustment means for selectively adjusting a length of said frame member extending over said cargo bed.

50. The cargo bed cover according to claim 49 wherein said adjustment means includes means for separating said rigid frame member into a first unit and a second unit.

51. The cargo bed cover according to claim 46 wherein each of said flexible frame members is enclosed within an channel formed by said fabric.

52. The cargo bed cover according to claim 51 wherein each of said flexible frame members has a substantially flat cross-section and is positioned to extend across the entire width of said cargo bed.

53. The cargo bed cover according to claim 52 wherein each of said flexible frame members is secured to the cargo bed at a point proximate to a point of securing said rigid frame member.

54. The cargo bed cover according to claim 51 wherein said flexible frame member has a first portion, a second portion, and a third portion and wherein the first portion is secured to said second portion by a first rigid securement member and the second portion is secured to the third portion by a second rigid securement member.

55. The cargo bed cover according to claim 54 further including a plurality of tie members and wherein the first and the second securement member is connectable to a selected rigid frame member via said tie members.

56. The cargo bed cover according to claim 46 further including a plurality of intermediate members being composed of semi-rigid material interposed in said fabric between said flexible frame members.

57. The cargo bed cover according to claim 56 wherein said intermediate members are position parallel to said flexible frame members.

58. The cargo bed cover according to claim 56 wherein said intermediate members are positioned perpendicular to said flexible frame members.

59. The cargo bed cover according to claim 46 wherein said fabric covering includes sealing means for sealing a selected peripheral portion of said fabric covering to said connecting means.

60. The cargo bed cover according to claim 59 wherein said sealing means includes an elastic material pressing against said connecting means.

61. The cargo bed cover according to claim 60 wherein said elastic material is fully enclosed in an envelope of said fabric covering.

62. The cargo bed cover according to claim 59 wherein said fabric covering includes a zippered flap portion for granting user access to the bed from a point exterior of said cover.

63. The cargo bed cover according to claim 62 wherein said zippered flap portion is positioned proximate to a cab of said vehicle.

64. The cargo bed cover according to claim 61 wherein said elastic material is pressed against said connecting means by a taut cable connected to said fabric.

65. The cargo bed cover according to claim 64 wherein said unit cable extends along at least three sides of said cargo bed.

66. The cargo bed cover according to claim 46 further including spring means for applying an upward pressure on said flexible frame members.

67. The cargo bed cover according to claim 66 wherein said spring means attaches to said connecting means.

* * * * *